(12) United States Patent
Eilam

(10) Patent No.: US 8,763,055 B1
(45) Date of Patent: *Jun. 24, 2014

(54) CROSS-PLATFORM VIDEO DISPLAY

(71) Applicant: GraphOn Corporation, Campbell, CA (US)

(72) Inventor: Eldad Eilam, San Jose, CA (US)

(73) Assignee: hopTo Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/670,163

(22) Filed: Nov. 6, 2012

Related U.S. Application Data

(62) Division of application No. 13/668,091, filed on Nov. 2, 2012.

(51) Int. Cl.
*H04N 7/173* (2011.01)

(52) U.S. Cl.
USPC ............ 725/93; 725/43; 725/86; 725/100

(58) Field of Classification Search
None
See application file for complete search history.

(56) References Cited

U.S. PATENT DOCUMENTS

| | | | |
|---|---|---|---|
| 5,745,115 | A | 4/1998 | Purple et al. |
| 5,831,609 | A | 11/1998 | London et al. |
| 6,636,242 | B2 | 10/2003 | Bowman-Amuah |
| 6,710,786 | B1 | 3/2004 | Jacobs et al. |
| 6,758,394 | B2 | 7/2004 | Maskatiya et al. |
| 7,039,875 | B2 | 5/2006 | Khalfay et al. |
| 7,185,069 | B2 | 2/2007 | Costin et al. |
| 7,325,027 | B2 | 1/2008 | Grown |
| 7,418,472 | B2 | 8/2008 | Shoemaker et al. |
| 7,472,157 | B2 | 12/2008 | Tolson et al. |
| 7,631,328 | B2 * | 12/2009 | Clancy et al. .......... 725/39 |
| 7,667,704 | B2 | 2/2010 | Hogle |
| 8,108,830 | B2 | 1/2012 | Bibr et al. |
| 8,583,627 | B1 | 11/2013 | Kamvar et al. |
| 2002/0196378 | A1 | 12/2002 | Slobodin et al. |
| 2003/0053091 | A1 | 3/2003 | Tanaka et al. |
| 2003/0069923 | A1 | 4/2003 | Peart |
| 2004/0177155 | A1 | 9/2004 | Enokida et al. |
| 2004/0205715 | A1 | 10/2004 | Taylor |

(Continued)

FOREIGN PATENT DOCUMENTS

WO WO 00/30729 6/2000
WO WO 2004/059938 7/2004

OTHER PUBLICATIONS

U.S. Appl. No. 13/341,754, Office Action dated Jul. 31, 2013.
U.S. Appl. No. 13/341,238 Office Action dated Apr. 22, 2013.

(Continued)

*Primary Examiner* — Chenea Smith
(74) *Attorney, Agent, or Firm* — Lewis Roca Rothgerber LLP

(57) ABSTRACT

A request is sent from a client device to a host device hosting an application. A display associated with execution of the application on the host device may include a video portion and one or more non-video portions. Information may be sent from the host device to the client device over the communication network. Such information may include display information for the video portion as described by raster data and information for the non-video portions as described by vector data. Such information may be used by the client device to generate a display corresponding to the host display. The video portion of the client display may be based on the raster data, and the non-video portions of the client display may be based on the vector data.

15 Claims, 2 Drawing Sheets

(56) References Cited

U.S. PATENT DOCUMENTS

| | | | |
|---|---|---|---|
| 2005/0080915 | A1 | 4/2005 | Shoemaker et al. |
| 2005/0198100 | A1 | 9/2005 | Goring et al. |
| 2006/0082581 | A1 | 4/2006 | Schmieder et al. |
| 2006/0082582 | A1 | 4/2006 | Schmieder et al. |
| 2006/0082583 | A1 | 4/2006 | Leichtling et al. |
| 2006/0085550 | A1 | 4/2006 | Schmieder et al. |
| 2006/0087512 | A1 | 4/2006 | Schmieder et al. |
| 2006/0149810 | A1 | 7/2006 | Koo et al. |
| 2006/0184982 | A1 | 8/2006 | Paz et al. |
| 2006/0195523 | A1 | 8/2006 | Juang et al. |
| 2006/0225037 | A1 | 10/2006 | Glein et al. |
| 2006/0227141 | A1 | 10/2006 | Hogle |
| 2007/0005693 | A1 | 1/2007 | Sampath et al. |
| 2007/0229524 | A1 | 10/2007 | Hendrey et al. |
| 2008/0009344 | A1 | 1/2008 | Graham et al. |
| 2008/0016155 | A1 | 1/2008 | Khalatian |
| 2008/0034320 | A1 | 2/2008 | Ben-Shachar et al. |
| 2008/0082604 | A1 | 4/2008 | Mansour et al. |
| 2009/0100483 | A1 | 4/2009 | McDowell |
| 2009/0228779 | A1 | 9/2009 | Williamson et al. |
| 2009/0271501 | A1 | 10/2009 | Shenfield et al. |
| 2009/0292999 | A1 | 11/2009 | LaBine et al. |
| 2009/0320073 | A1 | 12/2009 | Reisman |
| 2010/0005396 | A1 | 1/2010 | Nason et al. |
| 2010/0111410 | A1 | 5/2010 | Lu et al. |
| 2010/0118039 | A1 | 5/2010 | Labour |
| 2010/0279678 | A1 | 11/2010 | Li et al. |
| 2010/0281402 | A1 | 11/2010 | Staikos et al. |
| 2011/0032328 | A1 | 2/2011 | Raveendran et al. |
| 2011/0078532 | A1 | 3/2011 | Vonog et al. |
| 2011/0231782 | A1 | 9/2011 | Rouhrabaugh et al. |
| 2011/0239142 | A1 | 9/2011 | Steeves et al. |
| 2011/0283304 | A1* | 11/2011 | Roberts et al. .................... 725/9 |
| 2011/0299785 | A1 | 12/2011 | Albu et al. |
| 2012/0042275 | A1 | 2/2012 | Neerudu et al. |
| 2012/0084456 | A1 | 4/2012 | Vonog et al. |
| 2012/0102549 | A1 | 4/2012 | Mazzaferri et al. |
| 2012/0114233 | A1 | 5/2012 | Gunatilake |
| 2012/0117145 | A1 | 5/2012 | Clift et al. |
| 2012/0124497 | A1 | 5/2012 | Kasoju et al. |
| 2012/0166967 | A1 | 6/2012 | Deimbacher et al. |
| 2012/0214552 | A1 | 8/2012 | Sirpal et al. |
| 2012/0223884 | A1 | 9/2012 | Bi et al. |
| 2012/0254453 | A1 | 10/2012 | Lejeune et al. |
| 2012/0266079 | A1 | 10/2012 | Lee et al. |
| 2012/0299968 | A1 | 11/2012 | Wong et al. |
| 2012/0317295 | A1 | 12/2012 | Baird et al. |
| 2013/0019263 | A1 | 1/2013 | Ferren et al. |
| 2013/0124609 | A1 | 5/2013 | Martinez et al. |
| 2013/0194374 | A1 | 8/2013 | Kieft et al. |

OTHER PUBLICATIONS

U.S. Appl. No. 13/341,760 Office Action dated May 15, 2013.
U.S. Appl. No. 13/668,091 Office Action dated Apr. 23, 2013.
U.S. Appl. No. 13/668,095 Office Action dated Apr. 23, 2013.
U.S. Appl. No. 13/341,207, filed Dec. 30, 2011, Eldad Eilam, Automatic Adjustment for Cross-Platform Display.
U.S. Appl. No. 13/341,432, filed Dec. 30, 2011, Eldad Eilam, Cloud Based Automatic Adjustment for Cross-Platform Display.
U.S. Appl. No. 13/341,215, filed Dec. 30, 2011, Eldad Eilam, Managing Text for Cross-Platform Display.
U.S. Appl. No. 13/341,750, filed Dec. 30, 2011, Eldad Eilam, Cloud-based Text Management for Cross-Platform Display.
U.S. Appl. No. 13/341,222, filed Dec. 30, 2011, Eldad Eilam, Change Detection for Cross-Platform Display.
U.S. Appl. No. 13/341,754, filed Dec. 30, 2011, Eldad Eilam, Cloud Based Change Detection for Cross-Platform Display.
U.S. Appl. No. 13/341,227, filed Dec. 30, 2011, Eldad Eilam, Motion Vectors for Cross-Platform Display.
U.S. Appl. No. 13/341,756, filed Dec. 30, 2011, Eldad Eilam, Cloud-Based Motion Vectors for Cross-Platform Display.
U.S. Appl. No. 13/341,232, filed Dec. 30, 2011, Eldad Eilam, Client Side Detection of Motion Vectors for Cross-Platform Display.
U.S. Appl. No. 13/341,238, filed Dec. 30, 2011, Eldad Eilam, Image Hosting for Cross-Platform Display Over a Communication Network.
U.S. Appl. No. 13/341,760, filed Dec. 30, 2011, Eldad Eilam, Cloud-Based Image Hosting.
U.S. Appl. No. 13/341,425, filed Dec. 30, 2011, Eldad Eilam, Client Rendering.
U.S. Appl. No. 13/341,765, filed Jun. 6, 2012, Eldad Eilam, Cloud-Based Client Rendering.
U.S. Appl. No. 13/490,327, filed Jun. 6, 2012, Eldad Eilam, User Interface Management for Cross-Platform Display.
U.S. Appl. No. 13/490,329, filed Jun. 6, 2012, Eldad Eilam, User Interface Management for Cross-Platform Display.
U.S. Appl. No. 13/490,330, filed May 18, 2012, Eldad Eilam, Cloud-Based User Interface Management for Cross-Platform Display.
U.S. Appl. No. 13/475,911, filed May 18, 2012, Eldad Eilam, Facilitating Responsive Scrolling for Cross-Platform Display.
U.S. Appl. No. 13/475,912, filed May 18, 2012, Eldad Eilam, Facilitating Responsive Scrolling for Cross-Platform Display.
U.S. Appl. No. 13/475,913, filed May 18, 2012, Eldad Eilam, Cloud-Based Facilitation of Responsive Scrolling for Cross-Platform Display.
U.S. Appl. No. 13/475,916, filed May 18, 2012, Robert W. Currey, Decomposition and Recomposition for Cross-Platform Display.
U.S. Appl. No. 13/475,917, filed May 18, 2012, Robert W. Currey, Decomposition and Recomposition for Cross-Platform Display.
U.S. Appl. No. 13/475,918, filed May 18, 2012, Robert W. Currey, Cloud-Based Decomposition and Recomposition for Cross-Platform Display.
U.S. Appl. No. 13/668,091, filed Nov. 2, 2012, Eldad Eilam, Cross-Platform Video Display.
U.S. Appl. No. 13/668,095, filed Nov. 2, 2012, Eldad Eilam, Cloud-Based Cross-Platform Video Display.
U.S. Appl. No. 13/831,782, filed Mar. 15, 2013, Ck Hsu, Using Split Windows for Cross-Platform Document Views.
U.S. Appl. No. 13/831,783, filed Mar. 15, 2013, Ck Hsu, Using Split Windows for Cross-Platform Document Views.
U.S. Appl. No. 13/831,786, filed Mar. 15, 2013, Ck Hsu, Cloud-Based Usage of Split Windows for Cross-Platform Document Views.
Andujar, C.; Fairen, M.; Argelaguet, F., "A Cost-effective Approach for Developing Application-control GUIs for Virtual Environments," 3D User Interfaces, 2006. 3DUI 2006. IEEE Symposium on, vol., No., pp. 45,52, Mar. 25-29, 2006, doi:10.1109/VR.2006.6.
Borchers, J.; Ringel, M.; Tyler, J.; Fox, A., "Stanford interactive workspaces: a framework for physical and graphical user interface prototyping," Wireless Communications, IEEE, vol. 9, No. 6, pp. 64,69, Dec. 2002. doi: 10-1109/MWC.2002.1160083.
Boyaci, O.; Schulzrinne, Henning, "BASS Application Sharing System," Multimedia, 2008. ISM 2008. Tenth IEEE International Symposium on, vol., No., pp. 432,439, Dec. 15-17, 2008. doi:10.1109/ISM.2008.97.
Davidyuk, O., Georgantas, N., Issarny, V. & Riekki, J. (2009). MEDUSA: Middleware for End-User Composition of Ubiquitous Applications, In: Mastrogiovanni, F. & Chong, N.Y (Eds.), Handbook of Research on Ambient Intelligence and Smart Environments: Trends and Perspectives. IGI Global, to appear. Retrieved from: http://www.mediateam.oulu.fi/public.
Fabio Paterno, Carmen Santoro, and Antonio Scorcia. 2008. Automatically adapting websites for mobile access through logical descriptions and dynamic analysis of interaction resources. In Proceedings of the working conference on Advanced visual interfaces (AVI '08). ACM, New York, NY, USA, 260-267. DOI=10.1145/1385569.1385611 http://doi.acm.org/10.
Giulio Mori, Fabio Paterno, and Carmen Santoro. 2003. Tool support for designing nomadic applications. In Proceedings of the 8th international conference on Intelligent user interfaces (IUI '03). ACM, New York, NY, USA, 141-148. DOI=10.1145/604045.604069 http://doi.acm.org/10.1145/604045.604069.
Giulio Mori, Fabio Paterno, and Carmen Santoro, "Design and development of multidevice user interfaces through multiple logical descriptions," IEEE Transactions on Software Engineering, vol. 30, No. 8, pp. 507-520, Aug. 2004. doi:10-1109/TSE.2004.40.

(56) References Cited

OTHER PUBLICATIONS

Huifeng Shen; Yan Lu; Feng Wu; Shipeng Li, "A high-performance remote computing platform," Pervasive Computing and Communications, 2009. PerCom 2009. IEEE International Conference on, vol., No., pp. 1,6, Mar. 9-13, 2009. doi:10.1109/PERCOM.2009. 4912855.
Murielle Florins and Jean Vanderdonckt. 2004. Graceful degradation of user interfaces as a design method for multiplatform systems. In Proceedings of the 9th international conference on Intelligent user interfaces (IUI '04). ACM, New York, NY, USA, 140-147. DOI=10. 1145/964442.964469 http://doi.acm.org/10.1145/964442.964469.
Nathalie Aquino, Jean Vanderonckt, and Oscar Pastor. 2010. Transformation templates: adding flexibility to model-driven engineering of user interfaces. In Proceedings of the 2010 ACM Symposium on Applied Computing (SAC '10). ACM, New York, NY, USA, 1195-1202. DOI=10.1145/1774088.1774340 http://doi.acm.org/10-1145/1774088.1774340.
Oleg Davidyuk, Ivan Sanchez, Jon Imanol Duran, and Jukka Riekki. 2008. Autonomic composition of ubiquitous multimedia applications in Reaches. In Proceedings of the 7th International Conference on Mobile and Ubiquitous Multimedia (MUM '08). ACM, New York, NY, USA. 105-108. DOI=10.1145/1543137.1543159 http://doi.acm. org/10.1145/1543137.1543159.
Xu Hu; Congfeng Jiang; Wei Zhang; Jilin Zhang; Ritai Yu; Changping Lv, "An Even Based GUI Programming Toolkit for Embedded System," Services Computing Conference (APSCC), 2010 IEEE Asia-Pacific, vol., No., pp. 625,631, Dec. 6-10, 2010. doi: 10-1109/APSCC.2010.115.
U.S. Appl. No. 13/341,207 Office Action mailed Nov. 18, 2013.
U.S. Appl. No. 13/341,754, Office Action dated Jan. 8, 2014.
U.S. Appl. No. 13/341,227 Office Action mailed Oct. 23, 2013.
U.S. Appl. No. 13/341,756 Office Action mailed Aug. 13, 2013.
U.S. Appl. No. 13/341,238 Final Office Action dated Sep. 17, 2013.
U.S. Appl. No. 13/341,760 Office Action dated Nov. 20, 2013.
U.S. Appl. No. 13/490,329 Office Action mailed Jan. 15, 2014.
U.S. Appl. No. 13/490,330 Office Action mailed Dec. 17, 2013.
U.S. Appl. No. 13/475,916 Office Action dated Nov. 13, 2013.
U.S. Appl. No. 13/475,917 Office Action dated Nov. 18, 2013.
U.S. Appl. No. 13/668,091 Final Office Action dated Nov. 6, 2013.
U.S. Appl. No. 13/668,095 Office Action dated Nov. 5, 2013.
U.S. Appl. No. 13/831,782 Office Action dated Nov. 6, 2013.
U.S. Appl. No. 13/831,783 Final Office Action dated Dec. 17, 2013.
U.S. Appl. No. 13/831,783 Office Action dated Sep. 3, 2013.
U.S. Appl. No. 13/831,783 Final Office Action dated Dc. 17, 2013.
U.S. Appl. No. 13/831,783 Office Action dated Sep. 4, 2013.
U.S. Appl. No. 13/341,432 Office Action mailed Mar. 24, 2014.
U.S. Appl. No. 13/341,215 Office Action mailed Mar. 21, 2014.
U.S. Appl. No. 13/341,750 Office Action mailed Apr. 16, 2014.
U.S. Appl. No. 13/341,754, Office Action mailed Apr. 16, 2014.
U.S. Appl. No. 13/341,227 Final Office Action mailed Apr. 16, 2014.
U.S. Appl. No. 13/475,918 Office Action mailed Mar. 12, 2014.
US 8,689,268, 04/2014, Eilam (withdrawn).
U.S. Appl. No. 13/341,222, Office Action mailed Jan. 27, 2014.
U.S. Appl. No. 13/341,756 Final Office Action mailed Feb. 4, 2014.
U.S. Appl. No. 13/341,232 Office Action mailed Mar. 10, 2014.
U.S. Appl. No. 13/341,425 Office Action mailed Mar. 5, 2014.
U.S. Appl. No. 13/341,765 Office Action mailed Feb. 7, 2014.
U.S. Appl. No. 13/490,327 Office Action mailed Jan. 28, 2014.
U.S. Appl. No. 13/475,916 Final Office Action mailed Mar. 12, 2014.
U.S. Appl. No. 13/475,917 Final Office Action mailed Mar. 12, 2014.
U.S. Appl. No. 13/831,782 Final Office Action mailed Feb. 24, 2014.

* cited by examiner

CROSS-PLATFORM VIDEO DISPLAY

BACKGROUND

1. Field of the Invention

The present invention generally relates to cross-platform display. More specifically, the present invention relates to cross-platform video display.

2. Description of the Related Art

Individuals currently have a variety of options for communicating and carrying out transactions. Such options may include traditional desktop coming devices, as well as various mobile devices (e.g., mobile phones, smartphones, tablets). In fact, many individuals may use multiple computing and mobile devices at home, work, and on the move. For example, an individual may use a desktop computer at work, a laptop computer at home, and one or more mobile devices (e.g., smartphone, tablet) elsewhere. As such, people have come to expect to be able to have access to data and computing resources so to perform most computing tasks anywhere.

One difficulty in meeting such an expectation is that the various computing devices may not all have the same capabilities. For example, such devices may run different operating systems/platforms and applications. Such differences may make it difficult to support the same tasks across such devices. One solution has been to provide remote desktops where a first device runs the applications and a second device receives the visual display that appears on the first device over a communication network (e.g., Internet). Such remote desktops can allow users to access and control resources and data on the first device at a remote location using a second (e.g., portable) device.

One drawback to such an approach arises from the fact that such devices are generally used differently, so applications may be optimized for one type of device, but not another. For example, the different devices may have different sizes and input options (e.g., keyboard, keypad, touchscreen). The display of one device may not be optimized for a second device. For example, if a desktop computer display is shrunk to fit on a smartphone screen, the shrunken size may be difficult for the user to read or discern what is being displayed. Alternatively, if the display is not shrunken, the smartphone may only be able to display a portion of the original display at a time, which also adds to the difficulty in reading and discerning what is being displayed. While some devices allow for manual adjustment of the display by the user, changing displays and images may require the user to continually re-adjust the display, which may be unwieldy and inconvenient. Such is the case in many applications where content only uses a portion of the screen and user interface portions (e.g., toolbars, status bars, scroll bars, rulers).

Some conventional techniques for transmitting images may include sending information regarding a first image and commands (e.g., vectors) regarding any changes to that image. Such techniques may not be appropriate or work well with certain types of content. Content that may exhibit a large number of changes, however, may be difficult to convey as vectors. For example, video may include a number of images that may undergo a series of continual and quick changes. As such, techniques that rely on transmitting drawing commands as vectors may not be able to keep up with the pace of certain videos.

There is, therefore, a need in the art for improved systems and methods for user interface management for cross-platform video display.

SUMMARY OF THE CLAIMED INVENTION

Embodiments of the present invention include systems and methods for cross-platform video display. A request is sent from a client device to a host device hosting an application. A display associated with execution of the application on the host device may include a video portion and one or more non-video portions. Information may be sent from the host device to the client device over the communication network. Such information may include display information for the video portion as described by raster data and information for the non-video portions as described by vector data. Such information may be used by the client device to generate a display corresponding to the host display. The video portion of the client display may be based on the raster data, and the non-video portions of the client display may be based on the vector data.

Various embodiments of the present invention include methods for cross-platform video display. Such methods may include sending a request concerning application display information from a client device to a host device hosting an application, which may result in an application display on the host device. Methods may additionally include receiving information sent over the communication network from the host device including display information for the video portion as described by raster data and display information for the non-video portions as described by vector data, and generating a display on the client device corresponding to the host device display. The video portion of the client display may be based on the raster data, and the non-video portions of the client display may be based on the vector data.

Embodiments of the present invention may further include systems for cross-platform video display. Such systems may include a host device and a client device requesting information from a host device. The host device may provide data including information regarding a display of the host device. Such a display may include a video portion and one or more non-video portions. The video portion may be described by raster data, and the non-video portions may be described by vector data. Application display information, which includes raster data related to the video portion and vector data related to the non-video portion(s), may be sent to the client device. The client device may use the received data to generate a corresponding display. The raster data may be used to generate the video portion, while the vector data may be used to generate the non-video portions. In some embodiments, an intermediate device (e.g., server) may receive the request from the client device, retrieve information from the host device, identify the video and non-video portions, and generate and send the appropriate display instructions—include vector and raster data—to the client device.

Other embodiments of the present invention include non-transitory computer-readable storage media on which is embodied instructions executable to perform a method for cross-platform video display as previously set forth above.

DETAILED DESCRIPTION

Systems and methods for cross-platform video display are provided. A request is sent from a client device to a host device hosting an application. A display associated with execution of the application on the host device may include a video portion and one or more non-video portions. Information may be sent from the host device to the client device over the communication network. Such information may include display information for the video portion as described by raster data and information for the non-video portions as described by vector data. Such information may be used by the client device to generate a display corresponding to the host display. The video portion of the client display may be based on the raster data, and the non-video portions of the client display may be based on the vector data.

Figure 1:
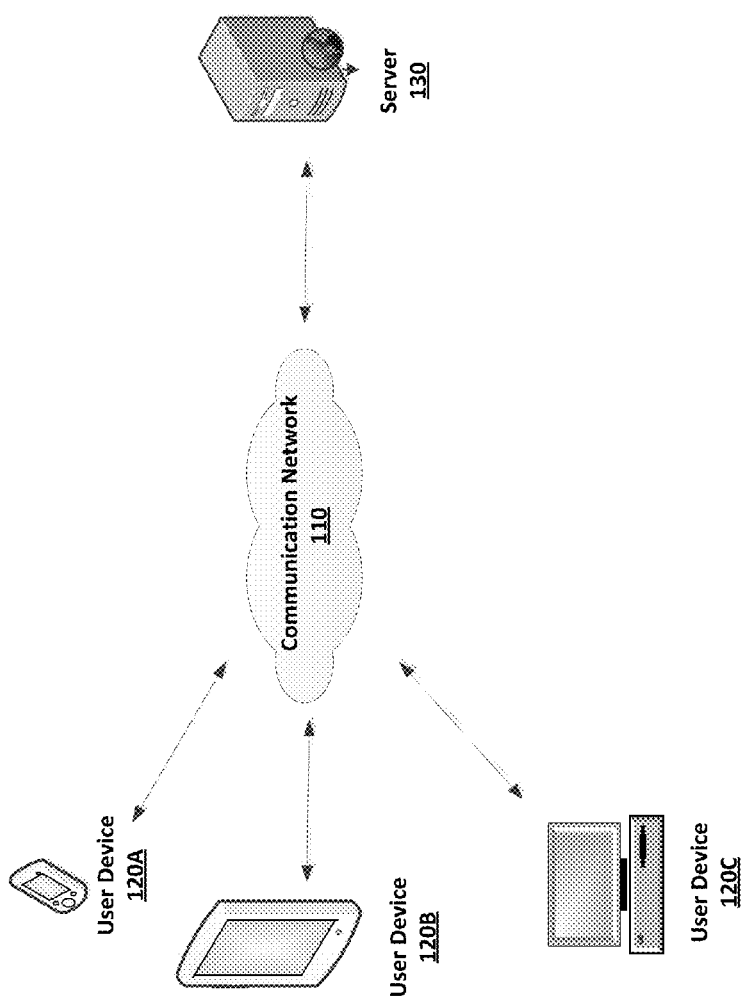
FIG. 1 illustrates a network environment in which an exemplary system for cross-platform video display may be implemented.

FIG. 1 illustrates a network environment 100 in which a system for cross-platform video display may be implemented. Network environment 100 may include a communication network 110, one or more user devices 120A-C, and a server 130. Devices in network environment 100 may communicate with each other via communications network 110.

Communication network 110 may be a local, proprietary network (e.g., an intranet) and/or may be a part of a larger wide-area network (e.g., the cloud). The communications network 110 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications network 110 allows for communication between the various components of network environment 100.

Users may use any number of different electronic user devices 120A-C, such as general purpose computers, mobile phones, smartphones, personal digital assistants (PDAs), portable computing devices (e.g., laptop, netbook, tablets), desktop computing devices, handheld computing device, or any other type of computing device capable of communicating over communication network 110. User devices 120 may also be configured to access data from other storage media, such as memory cards or disk drives as may be appropriate in the case of downloaded services. User device 120 may include standard hardware computing components such as network and media interfaces, non-transitory computer-readable storage (memory), and processors for executing instructions that may be stored in memory.

User device 120A is illustrated as a mobile phone or smartphone, while user device 120B is illustrated as a tablet computing device and client device 120C is illustrated as a desktop device. As can be seen, each user device 120 is sized differently and/or has different input options. Exemplary embodiments of the present invention allow for tasks and applications that are specific to one user device 120 (e.g., operating in a Microsoft Windows® environment) to be used and optimized for another user device 120 (e.g., operating in an Apple iOS® environment).

Each user device 120 may act as a host device interacting with a client device; likewise, each user device 120 may act as the client device in communication with a host. A user device 120 may further include a client application, a client 3D library, and a client display driver. Collectively, these elements may enable the user device and the user to consume computer graphics resources or services provided by server 110.

Server 130 may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Server 130 may associated with the same user and located in the same local network as user device 120C. Alternatively, server 130 may be located remotely (e.g., in the cloud) and may be associated with a third party that provides services in accordance with embodiments of the present invention. In some instances, the services may be provided via software (e.g., software as a service) downloaded from server 130 to one or more user devices 120. Updated software may similarly be downloaded as the updates become available or as needed.

Server application may represent an application executing ("running") on server 130. The functionality of server application may be visible to and accessible by client 120 via application publishing over the cloud (e.g., communication network 110), such as that supported by GraphOn GO-Global, Microsoft Remote Desktop Services, and Citrix XenApp. Examples of server application 132 may include a computer-aided design (CAD) application, such as AutoCAD® (by Autodesk, Inc. of San Rafael, Calif.) or Cadence Virtuoso (by Cadence Design Systems of San Jose, Calif.), a medical clinical workflow application such as Symbia.net (by Siemens AG of Munich, Germany), an interactive mapping application such as Google Earth (by Google, Inc of Mountain View, Calif.), or a 3D game.

Figure 2:
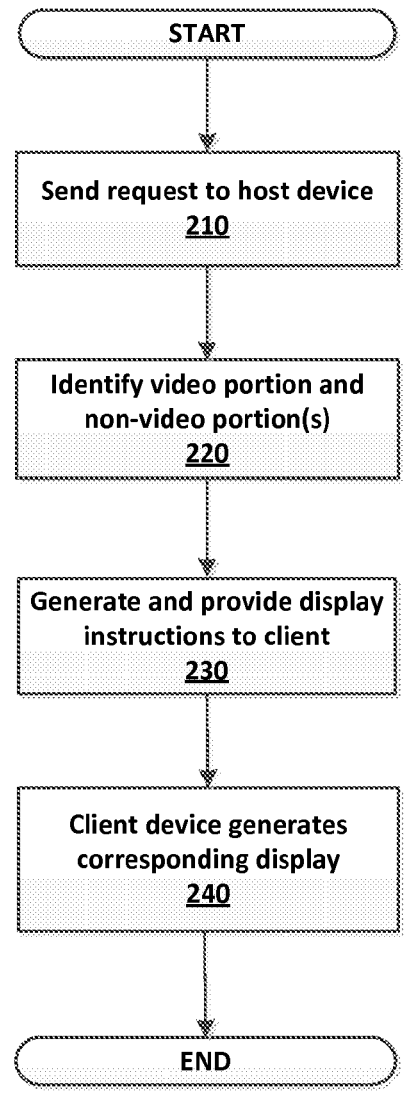
FIG. 2 is a flowchart illustrating an exemplary method for cross-platform video display.

FIG. 2 illustrates a method 200 for cross-platform video display. The method 200 of FIG. 2 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 2 (and the order thereof) are exemplary and may include various alternatives, equivalents, or derivations thereof including but not limited to the order of execution of the same.

In method 200 of FIG. 2, a request is sent to host device regarding a display associated with an application as executed on the host device. Such an application display may include a video portion and one or more non-video portions. Display instructions may generated for the client device. Such display instructions may include raster data for the video portion and vector data for the non-video portions. The resulting application display instructions may be sent to the client device. The client device may use the received data to generate a client display that corresponds to the host display. Such a display may be based on combining the received raster data for the video portion and vector data for the non-video portions In step 210, a request initiated at a requesting client device (e.g., user device 120A) is sent to a host device. The host device may be another user device 120 (e.g., user device 120C) and may host various types of data and resources, any of which may be subject of the request sent by the requesting client device 120A. For example, a mobile device 120A may request access to certain host data or may request that a task be performed by host device 120C (and/or host device applications).

The request may specifically concern information regarding the display of the host device 120C associated with execution of a certain application. For example, where the mobile device 120A requests a document hosted on host device 120C, the display may include a window presenting at least a portion of the requested document. Similarly, where the mobile device 120A requests that host device 120C perform a task (e.g., launch an application), the display may include a window presenting a user interface associated with the application. Still further applications may involve a variety of other content, including video content. Some of the content may exhibit a number of changes within a period of time.

In step 220, the host may identify a video portion and one or more non-video portions of the application display. Some applications may provide information that allow for identifying and manipulating such portions of the application display. Identification of the portions of the application display may therefore rely on any of the tools already present within an application or apply similar tools as known in the art for distinguishing between video and non-video portions of a window. In some embodiments, identification of the video and non-video portions may include identifying the video frames. Algorithms for detecting and identifying video may also be employed.

In step 230, display instructions may be generated and provided to the client device 120A. Separate display instructions may be generated for the video and non-video portions. The display instructions for the video portion(s) may describe the video display using raster data, while the display instructions for the non-video portion(s) may describe the non-video display using vector data. Executing the video instructions only may result in display of the video portion(s) in a screen devoid of non-video content. Likewise, executing the non-video instructions may result in a display screen with the non-video content alongside empty frames where the video portion appears on the host display.

In embodiments of the present invention, additional information regarding the video and non-video portions of the display may also be generated and sent to the client device. Such additional information may include metadata and information regarding context (e.g., placement of video in relation to non-video portions).

Such information, along with the other display instructions regarding the display, may be generated and provided to client device 120A for execution (step 240). The instructions provide for a display on the client device 120A corresponding to the display on the host device 120C. Upon receipt of all the display information/instructions described above, the client device 120A may be able to combine the raster and vector data for the respective video and non-video portions and generate a single screen display, which appears to correspond to the display on host device 120C. Other adjustments of the client device 120A display are also possible, including re-centering, adjusting text size, and other display adjustments known in the art.

Various embodiments of the present invention allow for the method 200 to be performed by an intermediary device (e.g., server 130) which may be associated with the host device or reside elsewhere in the network (e.g., in the cloud). For example, server 130 may receive the request from a requesting client device 120A, forward to a host client device 120C, receive responsive data from host client device 120C, use the responsive data to generate the display instructions for client device 120A display, which may then be sent to client device 120A, along with display information. Upon execution, the client device 120A may generate a display that corresponds to the display on the host device 120C.

Alternatively, the method 200 may be performed by software downloaded to a user device 120. For example, software located at either requesting client device 120A or host device 120C may provide a request initiated at the requesting client device 120A to host client device 120C, receive display data responsive to the request as provided by host client device 120C, use the responsive display data to generate the instructions for client device 120A display, which may then be sent or otherwise provided to client device 120A for execution.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for cross-platform display, the method comprising:
   receiving a request concerning application display information from a client device to a host device hosting an application;
   executing the application on the host device, wherein a host device display associated with execution of the application on the host device includes a video portion and one or more non-video portions;
   identifying the video portion of the generated display and the one or more non-video portions of the generated display;
   generating a plurality of separate sets of display instructions,
   wherein one separate set of the display instructions pertains to the identified video portion of the host device display and uses raster data to describe the identified video portion,
   wherein at least a second separate set of display instructions pertains to the identified one or more non-video portions of the generated display and uses vector data to describe the identified one or more non-video portions, and wherein a third separate set of display instructions pertains to placement of the identified video portion in relation to the identified one or more non-video portions when the identified video portion and the identified one or more non-video portions are combined into a single page; and transmitting the plurality of separate sets of display instructions over a communication network to the client device, wherein the client device executes the plurality of separate sets of display instructions in combination to generate a single display corresponding to the host device display, wherein the single display includes a video portion and one or more non-video portions, wherein the video portion of the client display is based on the raster data in the first separate set of display instructions and the one or more non-video portions of the client display is based on the vector data in the at least one second separate set of display instructions, and wherein the video portion of the single client display is placed in relation to the one or more non-video portions of the single client display based on the separate set of display instructions pertaining to placement.

2. The method of claim 1, further comprising responding to the request by identifying the video portion as video and the one or more non-video portions in the generated display as non-video.

3. The method of claim 2, wherein the instructions for identifying the video portion and the one or more non-video portions includes instructions for identifying a video frame of the video portion.

4. The method of claim 1, wherein at least one of the plurality of separate sets of display instructions includes metadata regarding the video portion and the one or more non-video portions.

5. The method of claim 1, wherein execution of the plurality of separate sets of display instructions in combination includes combining the raster data and the vector data to generate the single display on the client device.

6. An apparatus for cross-platform video display, the apparatus comprising:
a communication interface for receiving a request concerning application display information from a client device to a host device hosting an application; and
a processor for:
executing the application on the host device, wherein a host device display associated with execution of the application on the host device includes a video portion and one or more non-video portions,
executing instructions to identify the video portion of the generated display and the one or more non-video portions of the generated display,
executing instructions to generate a plurality of separate sets of display instructions,
wherein one separate set of the display instructions pertains to the identified video portion of the host device display and uses raster data to describe the identified video portion,
wherein at least a second separate set of display instructions pertains to the identified one or more non-video portions of the generated display and uses vector data to describe the identified one or more non-video portions, and
wherein a third separate set of display instructions pertains to placement of the identified video portion in relation to the identified one or more non-video portions when the identified video portion and the identified one or more non-video portions are combined into a single page; and wherein the communication interface transmits the plurality of separate sets of display instructions over a communication network to the client device, wherein the client device executes the plurality of separate sets of display instructions in combination to generate a single display corresponding to the host device display, wherein the single display includes a video portion and one or more non-video portions, wherein the video portion of the client display is based on the raster data in the first separate set of display instructions and the one or more non-video portions of the client display is based on the vector data in the at least one second separate set of display instructions, and wherein the video portion of the single client display is placed in relation to the one or more non-video portions of the single client display based on the separate set of display instructions pertaining to placement.

7. The apparatus of claim 6, further comprising responding to the request by identifying the video portion as video and the one or more non-video portions in the generated display as non-video.

8. The apparatus of claim 7, wherein the instructions for identifying the video portion and the one or more non-video portions include instructions for identifying a video frame of the video portion.

9. The apparatus of claim 6, wherein at least one of the plurality of separate sets of display instructions includes metadata regarding the video portion and the one or more non-video portions.

10. The apparatus of claim 6, wherein execution of the plurality of separate sets of display instructions in combination includes combining the raster data and the vector data to generate the single display on the client device.

11. A non-transitory computer-readable storage medium, having embodied thereon a program executable by a processor to perform a method for cross-platform video display, the method comprising:
receiving a request concerning application display information from a client device to a host device hosting an application;
executing the application on the host device, wherein a host device display associated with execution of the application on the host device includes a video portion and one or more non-video portions;
identifying the video portion of the generated display and the one or more non-video portions of the generated display;
generating a plurality of separate sets of display instructions,
wherein one separate set of the display instructions pertains to the identified video portion of the host device display and uses raster data to describe the identified video portion,
wherein at least a second separate set of display instructions pertains to the identified one or more non-video portions of the generated display and uses vector data to describe the identified one or more non-video portions, and
wherein a third separate set of display instructions pertains to placement of the identified video portion in relation to the identified one or more non-video portions when the identified video portion and the identified one or more non-video portions are combined into a single page; and transmitting the plurality of separate sets of display instructions over a communication network to the client device, wherein the client device executes the plurality of separate sets of display instructions in combination to generate a single display corresponding to the host device display, wherein the single display includes a video portion and one or more non-video portions, wherein the video portion of the client display is based on the raster data in the first separate set of display instructions and the one or more non-video portions of the client display is based on the vector data in the at least one second separate set of display instructions, and wherein the video portion of the single client display is placed in relation to the one or more non-video portions of the single client display based on the separate set of display instructions pertaining to placement.

12. The non-transitory computer-readable storage medium of claim 11, further comprising executable instructions for responding to the request by identifying the video portion as video and the one or more non-video portions in the generated display as non-video.

13. The non-transitory computer-readable storage medium of claim 12, wherein at least one of the plurality of separate sets of instructions specify that identifying the video portion and the one or more non-video portions includes instructions for identifying a video frame of the video portion.

14. The non-transitory computer-readable storage medium of claim 11, wherein at least one of the plurality of separate sets of display instructions includes metadata regarding the video portion and the one or more non-video portions.

15. The non-transitory computer-readable storage medium of claim 11, wherein at least one of the plurality of separate sets of display instructions includes information concerning combining the raster data and the vector data to generate the single display on the client device.

* * * * *